UNITED STATES PATENT OFFICE.

CHARLES S. HIGGINS, OF BROOKLYN, NEW YORK.

MANUFACTURE OF SOAP.

SPECIFICATION forming part of Letters Patent No. 248,314, dated October 18, 1881.

Application filed February 26, 1881. (No specimens.)

*To all whom it may concern:*

Be it known that I, CHARLES S. HIGGINS, of the city of Brooklyn, county of Kings, and State of New York, have invented a new and useful Improvement in the Manufacture of Soap, of which the following is a specification.

It is well known to those skilled in the art to which my invention or discovery pertains that soap is a detersive compound formed by the union of a fat or oil and an alkali, and that its chief use is for its cleansing properties—the result of its action and the slight excess of alkali in it upon the grease which holds the dirt on soiled textile fabrics and the skin.

In the manufacture of hard soaps the alkali generally used is a soda and the acid that of an animal fat or oleate. For soft soaps the alkali most suitable is a potash and the acid that of a vegetable or fish oil.

My invention relates more particularly to a hard soap, or that kind which is usually sold for laundry purposes in cakes or bars.

It must be borne in mind, in understanding the scope of my invention, that the mere mixing of a fat or oil and an alkali does not make a soap. It is necessary to have water present in sufficient quantities to allow of the process called "saponification." Common animal fat or tallow contains an oleate of the oxide of glyceryl—*i. e.*, the combination of oleic acid with the oxide of glyceryl. In the saponifying process the oleic acid of the fat seeks to leave the weaker base of the oxide of glyceryl and to unite with the stronger base of the soda. This is done by furnishing water to form a hydrate for the glyceryl, upon receiving which it gives up its acid to the soda.

Inasmuch, as other things being equal, the use of soap in a community increases in amount as its cost is lessened, it becomes an important consideration to furnish soap at as cheap a price as consistent with the attainment of the necessary qualities in the soap.

There are substances other than fats and oils which are capable of union with free alkalies, and produce, when so treated, a viscid detersive compound having properties similar to those in fat-made soaps. Most soaps for common laundry and household purposes are yellow or brownish in color. This is due to the use of rosin in the manufacture of the soap. It has been long well known that rosin is one of those substances which are capable of being saponified by a free alkali, so as to form a detersive compound valuable for cleansing purposes when combined with a fat-made soap. The rosin has in its composition three distinct bodies of acid properties—viz., sylvic, picric, and colopholic acids—and these, though each is insoluble in pure water, are all capable of combining with alkalies and dissolving in alkaline solutions. In a toilet-soap the use of rosin is not desirable; but in a soap for household and laundry purposes it is obvious that if rosin—a cheap article—can be made to take the place of a portion of the higher-priced fat and produce similar results, a great saving in price both to manufacturer and consumer can be effected. Another advantage of the use of rosin is that while a soap of pure animal fat or tallow quickly dries to an extent not desirable, and becomes brittle by mere exposure to air the introduction of rosin prevents this undue brittleness.

Prior to my invention the amount of rosin which it was found practical to incorporate in a hard soap was limited, the usual amount being only about six hundred pounds of rosin to two thousand pounds of fat in a mixture saponified by, say, one hundred and fifty pounds of soda-lye at a strength of 20°, or about one-fourth rosin. If a larger proportion of rosin were used, the amount of water absorbed rendered it soft and pasty and prevented it from hardening, so as to be durable or adapted to be framed and cut into cakes and bars.

I have discovered a process by which I am enabled to incorporate into a hard soap a much larger proportion of rosin, thereby availing myself of its cheap detersive properties, and at the same time producing a soap which is fully as hard and substantial, if not more so, than the usual hard soap made in greater part of fat.

The method in which I produce this result is as follows: For a cheap laundry-soap I take of prime tallow or equivalent fat, say, ten thousand pounds, which is saponified in the usual mode with a caustic-soda alkali of, say, 30° strength. After the first or "grease" change I add an equal quantity—viz., ten thousand pounds—of clear rosin, which is likewise saponified in the usual manner, about six thousand pounds of caustic-soda at a strength of about 30° being used altogether. Upon the completion of the saponifying process, and while the compound is hot and in a fluid state, before "framing," I add to the soap body a quantity of crystallized stearic acid of commerce equal in amount to about two per cent. of the bulk of the body to which it is added, or about three per cent. of stearine, the substance in either case being in a heated and fluid state. This is added gradually while the soap is hot, and is thoroughly "crutched" into the body, which is then framed in the usual manner, the result being that it solidifies into a hard and useful soap, having in its composition a resinous detersive equal in amount to the fatty detersive, instead of only one-third or one-fourth as much, as heretofore. This soap preserves its quality and hardness better than many fat-made soaps, and does not become unduly dry or brittle. It also posseses this advantage, viz: In most of the laundry-soaps used a large portion of the soap is wasted because of its solubility or dissolving faster and to a greater extent than is required for the strictly detersive purposes; but the soap produced by the process I have described lasts better and longer, besides being cheaper.

I am aware that stearine or other combinations of stearic acid have been heretofore used in making soap; but their use prior to my invention was during that portion of the process before saponification was completed, and the stearic acid in the former cases left its base and united with the alkali, undergoing a process of saponification; but in the process above described and invented by me the stearic acid is added after the saponification has taken place and after the alkaline base has united with the fatty and resinous acids, thereby effecting results entirely different from those cases where the stearate was added prior to the saponification.

I have described a very cheap grade of soap; but in the higher grades of laundry-soap the proportion of rosin may be lessened, still using the same amount of stearic acid or stearine.

Having thus described my improved process and its results, what I claim, and desire to secure by Letters Patent, is—

1. The within-described process of making soap—viz., the saponification of fats and resins and subsequent solidifying the same by stearic acid or stearine—substantially as described.

2. As a new article of manufacture, a rosin soap composed of tallow or its equivalent, rosin, a caustic alkali, and stearic acid or stearine, in substantially the proportions specified.

3. As a new composition of matter, a soap composed of saponified tallow, saponified rosin, and unsaponified stearic acid or stearine, substantially as and in the proportions described.

4. The use in the manufacture of rosin soap of stearic acid or stearine at a period subsequent to the saponification of its acid ingredients, substantially as described, for the purpose of solidifying the saponified rosin.

CHAS. S. HIGGINS.

Witnesses:
HERBERT M. NUTT,
RICHARD F. BYRNE.